(12) United States Patent
Vuk

(10) Patent No.: US 8,302,398 B2
(45) Date of Patent: Nov. 6, 2012

(54) WORK MACHINE WITH DRIVE TRAIN COUPLED TURBO COMPOUNDING

(75) Inventor: Carl T. Vuk, Denver, IA (US)

(73) Assignee: Deere & Company, Moline, IL (US)

( * ) Notice: Subject to any disclaimer, the term of this patent is extended or adjusted under 35 U.S.C. 154(b) by 787 days.

(21) Appl. No.: 12/201,277

(22) Filed: Aug. 29, 2008

(65) Prior Publication Data
US 2010/0050632 A1    Mar. 4, 2010

(51) Int. Cl.
*F02B 33/44* (2006.01)
*B60K 17/00* (2006.01)
(52) U.S. Cl. ........................ 60/605.1; 180/382
(58) Field of Classification Search ............... 60/605.1; 180/309, 381–383
See application file for complete search history.

(56) References Cited

U.S. PATENT DOCUMENTS

| | | | |
|---|---|---|---|
| 2,852,084 A * | 9/1958 | Glamann | 180/54.1 |
| 2,880,571 A * | 4/1959 | Glamann | 60/598 |
| 3,604,186 A | 9/1971 | Coleman | |
| 3,672,160 A | 6/1972 | Kim | |
| 3,990,242 A | 11/1976 | Muller | |
| 4,091,620 A | 5/1978 | Dorsch | |
| 4,449,370 A | 5/1984 | Ream | |
| 4,474,007 A | 10/1984 | Kronogard et al. | |
| 4,674,344 A * | 6/1987 | Kazino et al. | 74/7 A |
| 4,742,683 A | 5/1988 | Heminghous et al. | |
| 4,807,579 A | 2/1989 | Rees | |
| 5,138,840 A | 8/1992 | Oguchi et al. | |
| 5,906,089 A | 5/1999 | Guinn et al. | |
| 6,434,940 B1 | 8/2002 | Araujo | |
| 7,208,050 B2 * | 4/2007 | Boone et al. | 134/21 |
| 7,398,650 B2 * | 7/2008 | Bottcher et al. | 60/624 |
| 2002/0053207 A1 | 5/2002 | Finger et al. | |
| 2002/0062646 A1 | 5/2002 | Dellora et al. | |
| 2006/0162335 A1 * | 7/2006 | Vuk | 60/612 |

FOREIGN PATENT DOCUMENTS

| | | | |
|---|---|---|---|
| EP | 1606988 | | 12/2005 |
| JP | 04041935 A | * | 2/1992 |
| JP | 08260994 A | * | 10/1996 |
| JP | 2005069092 A | | 3/2005 |

OTHER PUBLICATIONS

JPO Machine Translation, JP 08-260994, Turbo Compound Engine, Mar. 13, 2012, http://dossier.ipdl.inpit.go.jp/text_trans.html.*

* cited by examiner

*Primary Examiner* — Quyen Leung
*Assistant Examiner* — Thomas Truong
(74) *Attorney, Agent, or Firm* — Taylor IP, P.C.

(57) ABSTRACT

A work machine having an internal combustion engine such as a diesel is connected to a transmission by a flexible coupling. The engine may have a turbocharger to increase its output. A power turbine is connected to receive exhaust products from the turbocharger turbine via an exhaust aftertreatment device. The power turbine is connected to either the transmission downstream of the flexible coupling or to an external load. In either case, the power turbine in the form of a centripetal turbine is isolated from the torsional vibrations of the IC engine.

12 Claims, 1 Drawing Sheet

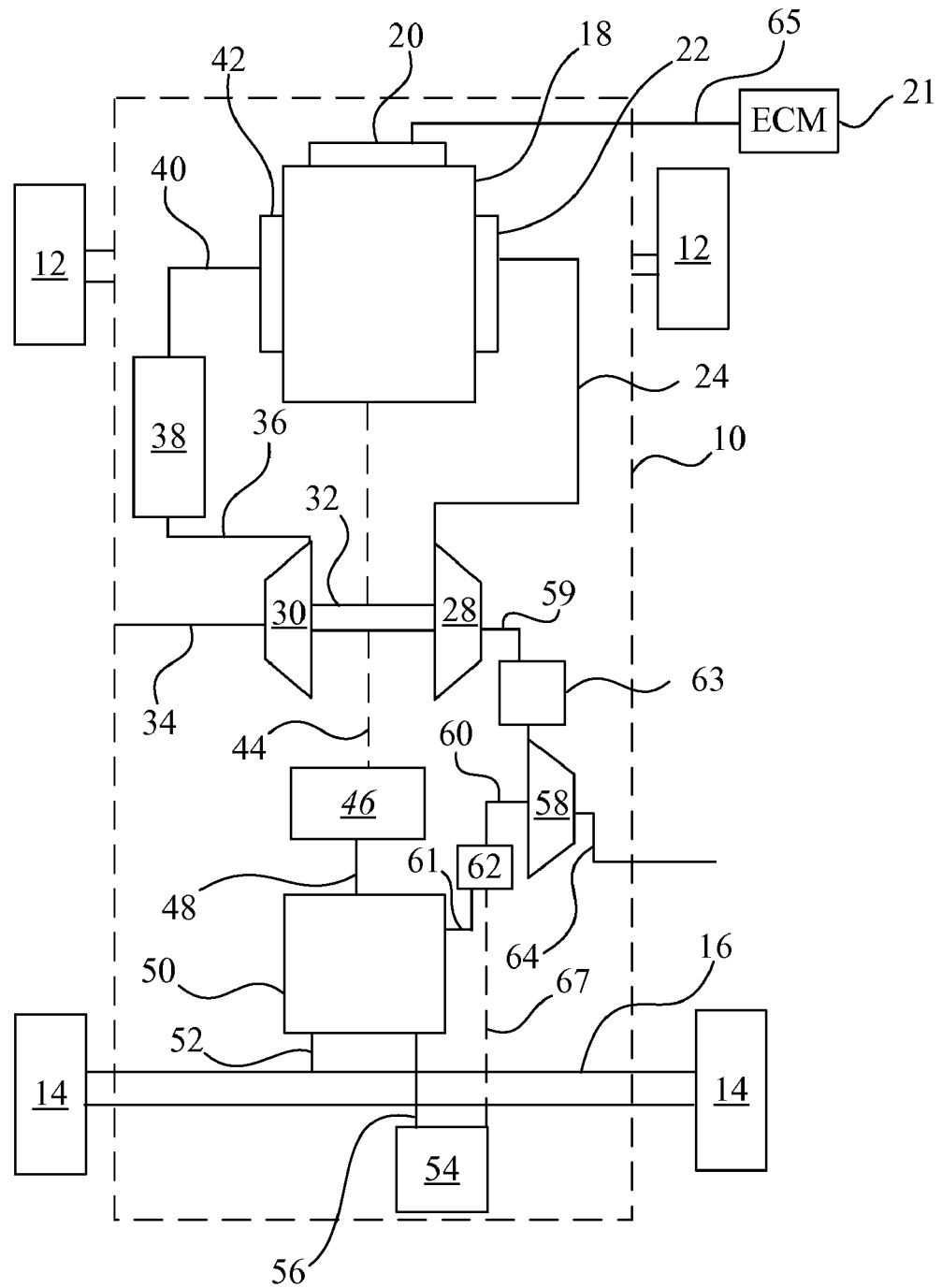

WORK MACHINE WITH DRIVE TRAIN COUPLED TURBO COMPOUNDING

FIELD OF THE INVENTION

The present invention relates to work machines and more specifically work machines incorporating turbo compounding.

For many years, the diesel, or compression ignition, engine has been used for work machines of the agricultural, industrial and forestry type. The reason for selection of diesel engines is that the inherent diesel cycle offers a high degree of fuel efficiency and extremely high fuel efficiency at low power output. The diesel engine is also inherently exceptionally durable owing to the basic requirement of its cycle to have a high compression ratio. This requires robust bearing, rotating and reciprocating components, thus ensuring reliable and long-term operating performance.

One of the disadvantages of the diesel engine, however, is that the high pressure ratios produce a rotary output that incorporates significant torsional vibration owing to the less than smooth power stroke when combustion occurs.

In recent years, the Environmental Protection Agency (EPA) regulations on emissions have been applied to work machines that are normally not classed as on-highway vehicles. This application of the EPA regulations has compromised the performance of the diesel engine and reduced its power and efficiency. The reason for this is that in-cylinder manipulation of variables to reduce oxides of nitrogen and particulates means that less power is captured in the cylinder.

One of the ways to recover some of the lost power is turbo compounding. Turbo compounding has existed for many years and was applied to reciprocating aircraft engines at the end of that era of aircraft propulsion to extract the maximum power out of a given engine envelope. Turbo compounding has been applied to on-highway vehicles in a parallel attempt to extract maximum power and efficiency out of the diesel cycle.

Typically, turbo compounding involves a power turbine of the centripetal type in which exhaust gases from the engine, usually after they have passed through a turbo charger turbine, are directed across its blades. The power turbine shaft is coupled through a rather significant gear reduction ratio to the engine crankshaft or flywheel. One of the problems with an arrangement of this type is the inherent torsional vibrations of the diesel engine are fed back to and amplified through the gear train to the power turbine. If a direct connection was maintained, failure of the power turbine would quickly result. In order to avoid this occurrence, a damper is provided between the gear train of the power turbine and the crankshaft of the diesel engine. Because of the frequency and nature of the torsional vibrations, dampers of the viscous type are typically utilized. While effective at damping the vibrations and isolating the power turbine, the viscous coupling is a relatively inefficient mechanical coupling having an efficiency of about 80-93%. This lack of efficiency significantly impedes the prospective benefit realized by incorporation of the turbo compounding concept.

What is needed in the art therefore is an efficient way of connecting a power turbine to a work machine system in a way that isolates vibration but has an efficient transmission of power.

SUMMARY OF THE INVENTION

In one form, the invention is a propulsion system having an air breathing, fuel consuming, reciprocating internal combustion (IC) engine which provides a rotary output and produces products of combustion. A power distribution device has at least a first rotary input and at least one rotary output. A flexible coupling connects the rotary output of the IC engine to the first rotary input of the power distribution device. The coupling damps torsional vibrations in the rotary output of the IC engine. At least one turbo machinery device is provided for receiving the products of combustion from the IC engine. The turbo machinery device includes at least one power turbine connected to one of a rotary input to the power distribution device and a rotary load device. The power distribution and rotary load device each require at least the maximum power output of the power turbine.

In another form, the invention is a work machine including a frame having wheels for land movement. An air breathing, fuel consuming, internal combustion engine provides a rotary power output and produces products of combustion. A power distribution device has at least a first rotary input and at least one rotary output connected to drive at least a portion of the wheels. A coupling connects the rotary power output of the IC engine to the first rotary input of the power distribution device. The coupling damps torsional vibrations in the rotary output of the IC engine. At least one turbo machinery device is provided to receive the products of combustion from the IC engine, the turbo machinery device including at least one power turbine connected to one of a second rotary input to the power distribution device and a rotary load device. The power distribution and rotary load device each require at least the maximum power output of the power turbine.

BRIEF DESCRIPTION OF THE DRAWINGS

FIG. 1 is a schematic drawing of a work machine in accordance with the present invention.

DETAILED DESCRIPTION OF THE INVENTION

FIG. 1 shows a work machine identified by dashed line 10 having wheels 12 and 14 for ground movement. Wheels 14 are powered by an axle assembly 16 through a connection to be described later. The work machine may be an industrial, agricultural or forestry vehicle providing motive operation but including processing features. For example, an agricultural work machine may be a combine which harvests, collects and processes crop material. The work machine may also be a forestry vehicle which cuts and transports logs in the field. Work machine 10 may also be an industrial vehicle having blades or earth moving features. None of these accessory items are shown to simplify the understanding of the present invention. However, they may be generally classified as an external load.

The work machine 10 is powered by an internal combustion engine 18. Engine 18 is typically an air breathing, fuel consuming, internal combustion (IC) engine in which measured and timed quantities of fuel are injected by a fuel system, generally indicated at 20, into cylinders in which pistons reciprocate, usually in a four stroke cycle operation to produce a rotary output. The combustion cycle of engine 18 may be spark ignition or compression ignition or a combination of the two. The fuel system 20 is controlled by an ECM 21 via suitable lines 65. With any of these systems, however, products of combustion are generated and these are delivered to an exhaust manifold 22 and through an exhaust line 24 to a turbine 28 of a turbo charger. The turbocharger turbine 28 is connected by a shaft 32 to a compressor 30.

Intake air is supplied by line 34 to compressor 30 where it is pressurized and delivered to a line 36 which passes through an after cooler 38 to line 40 and finally to the intake manifold 42 of engine 18. The after cooler 38 reduces the temperature of the inlet air and thus increases its density to provide higher power output from engine 18. The output of the IC engine 18 is connected by a mechanical drive 44 to a flexible coupling 46 and in turn from mechanical connection 48 to a power distribution device 50. The flexible coupling 46 is included in the power train of the vehicle to protect the power distribution device 56 from the same torsional vibrations that were described above. Typically the flexible coupling is one in which an elastomeric element is intimately adhered to and connects an input and output to the coupling. The torsional vibrations are taken up by the flexing of the elastomeric material and the energy thus generated is dissipated in the form of heat. Over the years, improvements in elastic materials and manufacturing methods have produced flexible couplings 46 that effectively isolate the power distribution device 50 from the torsional oscillations of engine 18. Furthermore, this type of coupling has a high degree of mechanical efficiency to deliver a maximum power output to load distribution device 50.

Mechanical connection 48 is considered to be a first input to load distribution device and mechanical connection 52 is a load output that connects the load distribution device through the powered axle assembly 16 to provide motive power to the wheels 14. It should be apparent to those skilled in the art that the power distribution device 50 may be a multi-speed gear transmission with multiple clutches and electronic controls. The powered axle 16 may also have differential gearing, lock-up drives, brake assemblies and other items as appropriate to effectively control the movement of and power to wheels 14.

At least a second output in the form of a mechanical connection 56 is provided from power distribution device 50 to a load 54. Load 54 may be a harvesting and processing apparatus in the case of an agricultural machine or earth-moving devices in the case of industrial and tree-cutting and grappling in the case of an forestry machine. The load 54 may ultimately be connected to the equipment mechanically or hydraulically or even electrically by motor/generator combinations.

In accordance with the present invention, a power turbine 58 is provided to receive the exhaust gases from turbocharger turbine 28 via a line 59. Power turbine 58 has an output shaft 60 that connects with a speed reduction gearbox 62 and connects either to power distribution box 50 via connection 61 or alternatively to the external load 54 via connection 67 shown in dashed lines.

An exhaust aftertreatment device 63 is provided at the upstream side of power turbine 58 and between the turbocharger turbine 28 and the power turbine 58. The exhaust aftertreatment device 63 may take many forms, each of which is intended to minimize products of combustion considered to be undesirable by the EPA. For example, the exhaust aftertreatment device may include a diesel oxidization catalyst (DOC), diesel particulate filter (DPF) and selective catalytic reduction (SCR).

Typically the power turbine 58 may be in the form of a centripetal turbine similar to centripetal turbines that are typically incorporated in turbochargers. Alternatively, it may be an axial power turbine.

In operation, the torsional oscillations of engine 18 are prevented from reaching the power distribution device 50 by the flexible coupling 46. In effect, the flexible coupling 46 isolates the power distribution from the torsional oscillations of engine 18. By connecting the power turbine 58 to the power distribution device 50 or external load 56 downstream of flexible coupling 46, no such engine torsional vibrations can reach the power turbine 58 to have an adverse affect on its long term durability. While effectively isolating the power turbine 58 from torsional oscillations of the engine 18, the mechanical efficiency between the power turbine and the power distribution is maximized by having a substantially direct mechanical connection between the rotating output of the power turbine and the power distribution device 50.

In addition, by coupling the power turbine to the power distribution device 50, the installation constraints of previous turbocompound systems coupling the power turbine to the engine flywheel or rear gear train are eliminated. As a result, enough space is made available to place the exhaust aftertreatment device 63 in between the turbocharger turbine 28 and the power turbine 58. This position has a profound effect on the efficiency of the system because moving the restrictions of the exhaust aftertreatment device from downstream of the power turbine as in prior applications to upstream cause the pumping losses and restriction seen by the engine to be reduced by almost half.

Having described the preferred embodiment, it will become apparent that various modifications can be made without departing from the scope of the invention as defined in the accompanying claims.

The invention claimed is:

1. A propulsion system comprising:
   an air breathing, fuel consuming reciprocating internal combustion (IC) engine providing a rotary power output and producing products of combustion;
   a power distribution device having at least a first rotary input and at least one rotary output;
   an elastomeric flexible coupling connecting the rotary output of said IC engine to the first rotary input of said power distribution device, said coupling damping torsional vibration in the rotary power output of said IC engine;
   at least one turbo machinery device receiving the products of combustion from said IC engine, said turbo machinery device including at least one power turbine connected to one of a rotary input to said power distribution device downstream of said flexible coupling and a rotary load device, said turbo machinery device having a substantially direct mechanical connection to said power distribution device, and
   an exhaust aftertreatment device upstream of said power turbine.

2. The propulsion system of claim 1, further comprising a turbocharger connected to said IC engine and interposed between said IC engine and said power turbine.

3. The propulsion system as claimed in claim 2, wherein said exhaust aftertreatment device is interposed between said turbocharger turbine and said power turbine.

4. The propulsion system as claimed in claim 1, further comprising a speed reduction device between said power turbine and one of the rotary input to the power distribution device and the rotary load device.

5. The propulsion system as claimed in claim 1, having an external load to which said power turbine is connected.

6. The propulsion system as claimed in claim 1, wherein said power distribution device is a transmission having gear sets to provide rotary power output.

7. A work machine comprising:
   a frame having wheels for land movement;
   an air breathing fuel consuming internal combustion (IC) engine providing a rotary power output and producing products of combustion;

a power distribution device having at least a first rotary input and at least one rotary output connected to drive at least a portion of said wheels;

an elastomeric flexible coupling connecting the rotary power output of said IC engine to the first rotary input of said power distribution device, said coupling damping torsional vibration in the rotary power output of said IC engine; and at least one turbo machinery device receiving the products of combustion from said IC engine, said turbo machinery device including at least one power turbine connected to one of a second rotary input to said power distribution device downstream of said flexible coupling and a rotary load device, said turbo machinery device having a substantially direct mechanical connection to said power distribution device, and comprising an exhaust aftertreatment device upstream of said power turbine.

8. The work machine as claimed in claim 7, further comprising a turbocharger connected to said IC engine and having a turbine interposed between said IC engine and said power turbine.

9. The work machine as claimed in claim 8, wherein said exhaust aftertreatment device is interposed between said turbocharger turbine and said power turbine.

10. The work machine as claimed in claim 7, further comprising an (revolutions per minute) RPM reduction device between the power turbine and one of the rotary input to the power distribution device and the rotary load device.

11. The work machine as claimed in claim 7, further comprising an external load to which the power turbine is connected.

12. The work machine as claimed in claim 7, wherein the power distribution device is a transmission having multiple gear sets.

* * * * *